Oct. 23, 1956
D. J. GARRETSON
2,768,362
ELECTRIC TERMINAL WITH MOUNTING BRACKET
Filed Sept. 23, 1952
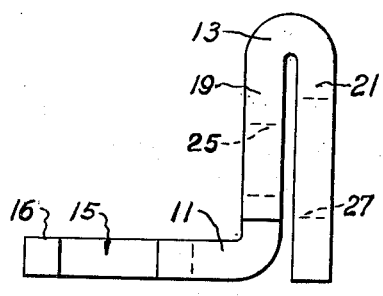
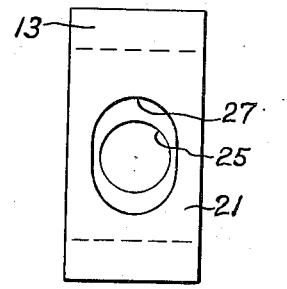
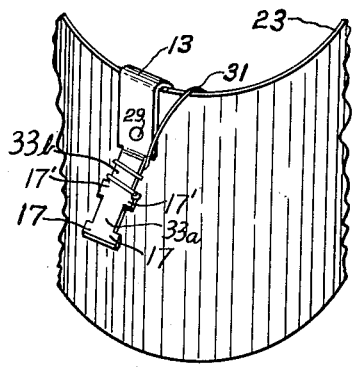
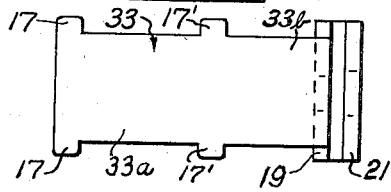
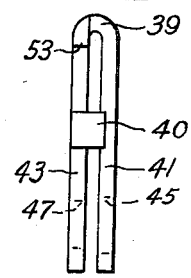
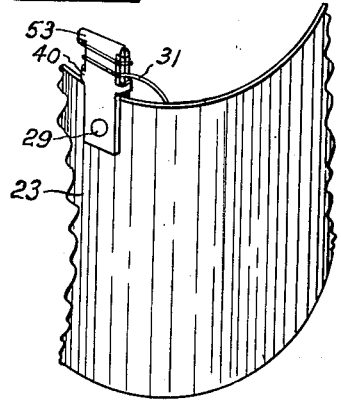
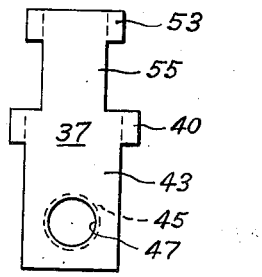
INVENTOR.
DONALD J. GARRETSON
BY *F. O. Hicks*
His Attorney

United States Patent Office 2,768,362
Patented Oct. 23, 1956

2,768,362

ELECTRIC TERMINAL WITH MOUNTING BRACKET

Donald J. Garretson, Southfield Township, Oakland County, Mich.

Application September 23, 1952, Serial No. 311,068

4 Claims. (Cl. 339—220)

The invention pertains to electrical terminals and more particularly to an electrical terminal combined with a mounting bracket or clip for convenient attachment upon a piece of electrical insulation material.

It is an object of my invention to provide an improved electrical terminal made simply of a single strip of metal in a form embodying an electric wire soldering lug combined integrally with wire anchoring means and a mounting or attachment bracket or clip.

It is also an object of my invention to provide an electric terminal made of a single metal strip simply formed to provide electric wire anchoring means and soldering lug means at one end and a mounting clip or attachment bracket at the other end.

It is a further object of my invention to provide an electric terminal made simply of a strip of suitably resilient and conductive metal bent to provide a mounting clip between the two ends thereof and conformed to provide wire anchoring means and wire soldering lug means upon the intermediate or mid-portion of the strip.

The invention will be more readily understood and additional objects and advantages thereof will become apparent by reading the following specification in conjunction with the appended drawings showing embodiments of the invention, in which like reference characters have been applied to corresponding parts throughout, and in which:

Fig. 1 is a side or edge elevational view showing one embodiment of my improved electric terminal;

Fig. 2 is a bottom view of the electric terminal shown in Fig. 1;

Fig. 3 is a front elevational view thereof;

Fig. 4 is a bottom view of another embodiment of my improved electric terminal, and showing a different modification of the wire anchor and soldering lug means;

Fig. 5 is a perspective view showing an installation thereof upon a cylinderical shell of insulation such as commonly encloses an electrical winding;

Fig. 6 is a side or edge elevational view of a different modification of the electrical terminal;

Fig. 7 is a front elevational view of the electric terminal shown in Fig. 6; and Fig. 8 is a perspective view showing an installation of the electrical terminal shown in Figs. 6 and 7.

Referring more specifically to Figs. 1, 2 and 3 of the drawing, I have illustratively disclosed an embodiment of my improved electrical terminal comprising a strip of suitably resilient and conductive metal 11 bent or formed to provide a pair of angularly related arms, one being of a generally flat U-shape, and the other providing a wire-connecting means for the terminal. The U-shaped arm is indicated at 13. The wire-connecting arm or anchoring means is indicated at 15 and includes a pair of wire-connecting portions 15a and 15b of a reduced width, spaced apart linearly along the arm by laterally projecting ears or soldering lugs 16¹. At the outer free end of arm 15, a pair of oppositely laterally projecting lugs or ears 16 provide a head portion for the arm to prevent a wire wrapped about the wire-connecting portion 15a from being accidentally pulled off the end of the arm. The ears 16¹ together with the linear spacing apart of the wire-connecting portions 15a and 15b serve to prevent the soldering heat, when soldering a wire to one wire-connecting portion, from melting a previously soldered connection of a wire at the other wire-connecting portion.

The wire anchoring means 15 projects at a right angle, or other lateral relation, from the lower part of a leg 19 of the mounting loop or clip 13. The leg 19, termed the rear leg, is spaced from the front leg 21, at a distance to provide suitable space for receiving a piece of electrical insulation therebetween for mounting the electric terminal thereon. It will be noted that such spacing will receive a piece of insulation whose thickness is less than that of the strip 11 from which the terminal is formed.

Fig. 4 shows a different modification of the wire attaching extension, and this electric terminal, shown in a bottom view, is represented as made of a lighter gauge of sheet metal. As shown, arm 33 is of a reduced width throughout and it is provided with two intermediate soldering lugs 17' and two end soldering lugs 17, the lugs projecting laterally from the wire anchoring extension for conveniently receiving wires to be soldered thereto after being suitably wound or wrapped upon the anchoring means of reduced width.

In installation of the electric terminal upon electrical apparatus having a cylindrical shell 23 of insulation material, as commonly provided enclosing the windings of transformers, and other electrical apparatus (not shown), one edge of this insulating shell is inserted into the space between the two legs of the U-shaped loop 13, as shown in Fig. 5. The two legs of the mounting clip are provided with two aligned apertures 25 and 27, as shown in Figs. 1, 2 and 3, and for securing the terminal upon the insulation shell, a rivet 29, or other suitable fastening means is passed therethrough. After the insulation shell has been installed upon the winding, an electric wire 31, from such apparatus, is brought out and wound or wrapped several times around the anchor 15, after which the end of the wire is attached to one of the lugs 17', or to the wire-connecting portion 33b, as by soldering it firmly thereto. In this manner, good conductive connection is provided along with good mechanical strength. Although the electric terminal shown installed in Fig. 5 has its soldering lugs and anchor means formed as in Fig. 4, it will be understood that the modification shown in Figs. 1, 2 and 3 is also installable in the manner shown in Fig. 5.

For making such electric terminals with combined wire anchor means and soldering lugs, along with integral mounting clip or bracket, it is only necessary to strike-out from suitable sheet metal, strips formed to provide all these features, and this is readily done in one operation for mass production. Such formed strips can then be readily bent to the U-shaped loops to provide the electric terminal having the integral mounting bracket, wire anchor means and soldering lugs.

Figs. 6 and 7 show a modification of my electric terminal wherein a strip 37 of suitably resilient and conductive metal is bent to form a U-shaped loop 39 with the legs 41 and 43 suitably spaced to serve as a mounting clip, and attachment apertures 45 and 47 being provided near the ends thereof. The mid-portion of one of the legs is provided with stop tabs 40 projecting from the opposite edges thereof and these are bent to extend across the space between the two legs to limit the insertion of a piece of insulation 23 therebetween, as shown in Fig. 8, so that the yoke portion of the U-shaped loop extends above or away from the edge of the insulation material. This yoke portion of the loop is cut away to provide protruding edges to serve as wire soldering lugs 53 upon an extension having edges of reduced width forming wire anchor means 55.

After this mounting clip has been inserted upon an edge of a piece of electrical insulation material 23 a rivet 29, or other suitable fastening means, is inserted to secure it firmly thereon. The electrical wire 31, from the apparatus (not shown) is then brought out and wrapped around, or between, the legs 41 and 43 above the stop tabs 40 after which the end of the wire is soldered to one of the soldering lugs 53, as shown in Fig. 8. This combined wire anchor and soldering means and mounting bracket is also conveniently made by stamping it out of sheet metal and bending is suitably, as described in reference to the previous modifications of the invention. Likewise, these modifications of my electric terminal may be mounted upon sheet insulation material in the form of a straight strip, or any other forms providing an exposed edge at a suitable position for mounting the terminal to receive an electrical conductor to be conductively connected and firmly anchored thereto.

The terminals herein disclosed are particularly well suited with relatively brittle or fragile insulating sheets or shells as they will not readily tear out of the insulation. It will be noted that the thickness of the metal strip shown in Figs. 4 and 5 from which each terminal is formed, is substantially the same thickness as the insulation sheet over the marginal edge of which the terminal is received.

It is apparent that within the scope of my invention, modifications and different arrangements may be made other than herein disclosed, and the present disclosure is illustrative merely, the invention comprehending variations.

What I claim as my invention is:

1. An electric terminal adapted to be received over a marginal edge portion of a sheet of brittle insulating material comprising: a flat strip of resistingly bendable electrically conductive material of a thickness equal to substantially the thickness of the insulating sheet and bent to provide a pair of angularly related arms; one of said arms being folded upon itself to define a U-shaped flat loop having parallel legs adapted to overlie opposite sides of the brittle sheet of insulating material and bear uniformly against the sheet throughout the length and width of the legs; said legs provided with opposed apertures through which fastener means may be extended to secure the legs to the insulating sheet; the other of said arms provided with linearly spaced apart wire-connecting portions each of a length equal to a plurality of diameters of the wire to be connected thereto and separated linearly along the arm by at least one laterally projecting ear integral with the arm.

2. The invention as defined in claim numbered 1 characterized in that the second-mentioned arm is provided at the outer end with a pair of laterally oppositely extending ears forming a head portion for the arm and preventing a wire wrapped about the arm from being withdrawn off of the end thereof, and another ear projects laterally away from the second-mentioned arm at a point opposite the ear separating the wire-connecting portions to form with such ear a pair of ears disposed along the arm at a point intermediate the head portion thereof and the junction with the first-mentioned arm.

3. The invention as defined in claim numbered 1 characterized in that said angularly related arms are of substantially equal length and the transverse width of the second-mentioned arm through the ears is substantially equal to the transverse width of the first-mentioned arm, and the transverse width of the second-mentioned arm at the wire-connecting portions is less than the transverse width of the first-mentioned arm.

4. The invention as defined in claim numbered 1 characterized in that said parallel legs of the U-shaped arm are provided with oppositely disposed substantially aligned apertures with one of the apertures being generally elongate and the other aperture being circular, and said fastener means includes a fastener member extended through the apertures and through the insulating sheet over which the U-shaped arm is received with opposite ends of the fastener member overlying the outside surface of the legs to hold the legs against the insulating sheeet.

References Cited in the file of this patent

UNITED STATES PATENTS

| Re. 23,921 | Scoville | Jan. 11, 1955 |
| 1,885,477 | Potter | Nov. 1, 1932 |
| 2,269,241 | Ayers | Jan. 6, 1942 |
| 2,420,754 | MacFadden | May 20, 1947 |
| 2,445,587 | Sims | July 20, 1948 |

FOREIGN PATENTS

| 108,048 | Austria | Nov. 25, 1927 |